May 10, 1932. N. W. STEPHENS 1,857,265
AUTOMATIC ADJUSTING ATTACHMENT FOR CONCAVES
Filed Aug. 13, 1930

Patented May 10, 1932

1,857,265

UNITED STATES PATENT OFFICE

NEAL W. STEPHENS, OF CALDWELL, KANSAS

AUTOMATIC ADJUSTING ATTACHMENT FOR CONCAVES

Application filed August 13, 1930. Serial No. 475,026.

This invention relates to an attachment designed primarily for use in connection with combines, one of the objects being to provide a means whereby the concave of the combine can adapt itself automatically to the size of the wheat being threshed.

As is well known to those skilled in the art, wheat grown in a large field is not always of the same size or grade. As a combine travels along a field it will thresh the wheat supplied thereto and if the machine is first adjusted for threshing a medium or light grade of wheat, but, during its progress, is supplied with a heavy grade of wheat, the machine will become clogged unless it is stopped, opened, and adjusted by hand to the larger or heavier grade of wheat. It also happens frequently that weeds and other materials entering between the concave and the cylinder tend to choke the machine and interfere with its operation.

It is an object of the present invention to provide a threshing machine with means for automatically adjusting the concave relative to the cylinder so as to adapt the mechanism to the grade of wheat being threshed, thereby eliminating the necessity of stopping the mechanism and adjusting it by hand.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

Figure 1:
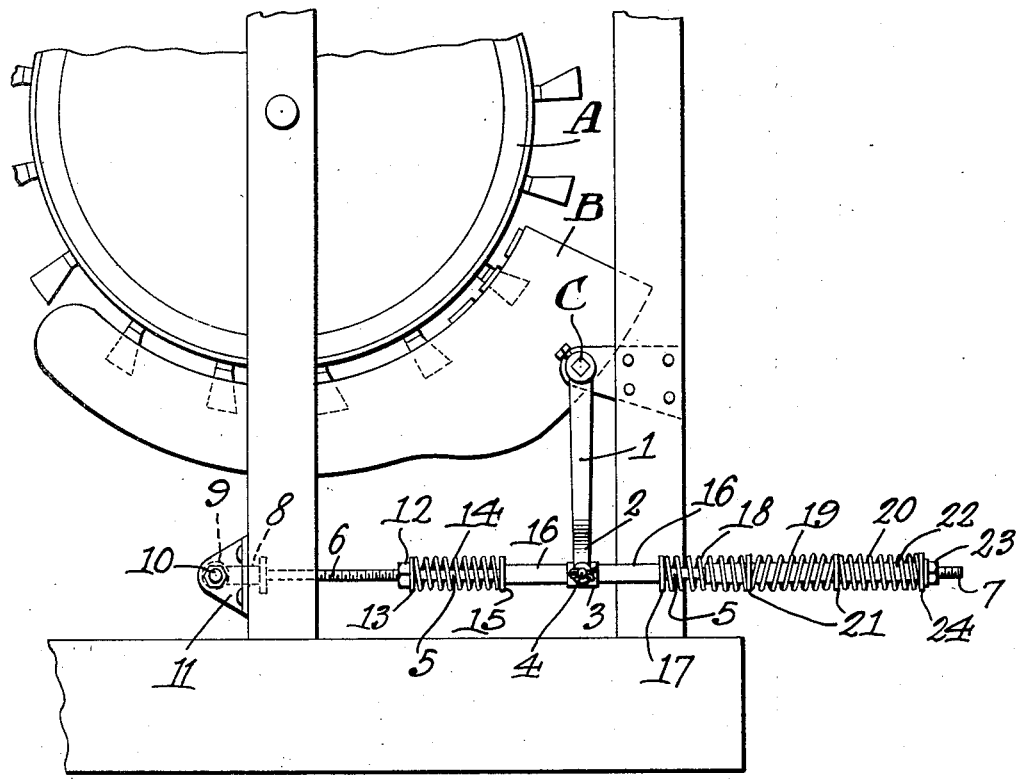
Figure 1 is a side elevation of a portion of a combine showing a concave equipped with the automatic adjusting means constituting the present invention.
Figure 2:
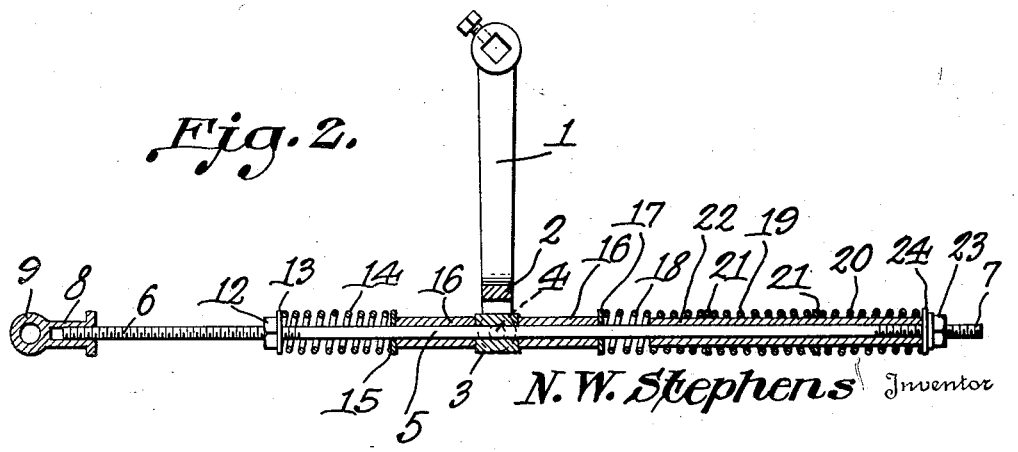
Figure 2 is an enlarged vertical section through the attachment, the swinging arm being shown partly in section and partly in elevation.

Referring to the figures by characters of reference, A designates a threshing cylinder cooperating with a concave B which is supported by a shaft C. This shaft is fixed to the concave and the concave and shaft rotate together so as to cause the concave to move toward or from the cylinder. This structure is well known but it becomes necessary to provide some hand operated mechanism for rotating shaft C so as to adjust the concave angularly, and this usually necessitates stopping the machine.

The present invention includes an arm 1 which is adapted to be secured on one end of shaft C where it takes the place of the usual adjusting mechanism. One end of this arm is forked as indicated at 2 and is adapted to straddle a block 3 having trunnions 4 which extend into the fork.

Slidably mounted in the block 3 is a rod 5 having its end portions screw-threaded as shown at 6 and 7. The threaded portion 6 extends into and engages a tubular extension 8 on a collar 9 which is pivotally mounted at 10 in a bracket 11 or other suitable means provided therefor.

A nut 12 is adjustably mounted on the threaded portion 6 and bears against a washer 13 engaging one end of a coiled spring 14 through which the rod 5 extends. Another washer 15 is interposed between this spring and a spacing sleeve 16 which is mounted on rod 5 between spring 14 and block 3. Another spacing sleeve 16 is interposed between block 3 and a washer 17 which constitutes an abutment for a coiled spring 18 mounted on rod 5. Other coiled springs 19 and 20 are mounted on the rod and are spaced apart by washers 21. A sleeve 22 can be loosely mounted in the springs for holding them properly aligned.

A nut 23 engages the threaded portion 7 of the rod and bears against a washer 24.

The springs 18, 19 and 20, are of sufficient strength to exert a thrust through sleeve 16 against block 3 and hold arm 1 where it will support the concave B in proper position relative to the cylinder head to thresh small or light grades of wheat. As the machine advances along a field and the wheat is fed thereto, it will be threshed in the usual manner and should wheat of a large or heavy grade be reaped and fed into the machine it will not choke the mechanism. Instead the pressure of the wheat against the concave will force it downwardly so that arm 1 will thrust against the action of springs 18, 19 and 20. To permit this operation the concave can be pivotally supported at one end only, that being the end to which arm 1 is connected. Thus the concave is yieldingly supported solely by the springs and the parts associated therewith. When the size of wheat becomes of a smaller grade, the springs will move the concave back toward its normal position. Spring 14 cooperates with the other springs for maintaining the movable parts normally in the position to which they are adjusted at the beginning of the harvesting and threshing operation. The tension of the springs can be regulated when desired by adjusting the nuts 12 and 23.

This attachment can be applied readily to combines of that type utilizing pivotally mounted concaves and it will be found that a considerable saving of time and labor will be effected thereby.

What is claimed is:

The combination with a cylinder, of a concave, a pivot device for supporting the concave at one end, an arm secured to the pivot device and adapted to swing with the concave about the axis of said device, a rod pivotally mounted, a member slidable thereon and pivotally engaged by the arm, springs on the rod at opposite ends of said member, and means on the rod for varying the compression of the springs and for shifting the normal position of the slidable member relative to the rod and correspondingly changing the normal position of the concave relative to the cylinder.

In testimony that I claim the foregoing as my own, I have hereto affixed my signature.

NEAL W. STEPHENS.